United States Patent
Dultz et al.

(10) Patent No.: US 6,636,278 B1
(45) Date of Patent: Oct. 21, 2003

(54) DEVICE FOR THE LOCAL ATTENUATION OF THE LIGHT INTENSITY IN THE FIELD OF VISION OF A LIGHT-SENSITIVE MONITORING DEVICE

(75) Inventors: Wolfgang Dultz, Frankfurt/M (DE); Leonid Beresnev, Darmstadt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/286,882

(22) Filed: Apr. 6, 1999

(30) Foreign Application Priority Data

Apr. 6, 1998 (DE) .......................... 198 15 337

(51) Int. Cl.[7] .................. G02F 1/135; G02F 1/1335; H04N 5/225; G02C 7/10
(52) U.S. Cl. ................... 349/25; 349/13; 348/341; 351/44
(58) Field of Search ............... 349/25, 13, 29; 348/341, 207; 341/44; 345/7

(56) References Cited

U.S. PATENT DOCUMENTS

| | | | |
|---|---|---|---|
| 4,462,661 A | 7/1984 | Witt | |
| 5,056,897 A | 10/1991 | Akiyama et al. | |
| 5,073,010 A | 12/1991 | Johnson et al. | |
| 5,126,866 A * | 6/1992 | Yoshimizu et al. | 359/63 |
| 5,353,080 A | 10/1994 | Christman | |
| 5,384,649 A * | 1/1995 | Takimoto et al. | 359/67 |
| 5,406,400 A * | 4/1995 | Matsuda | 359/86 |
| 5,420,709 A | 5/1995 | Kato et al. | |
| 6,094,249 A * | 7/2000 | Robinson et al. | 349/141 |
| 6,204,901 B1 * | 3/2001 | Knox | 349/96 |

FOREIGN PATENT DOCUMENTS

| | | |
|---|---|---|
| AT | 2 014 179 | 11/1974 |
| DE | 33 03 100 | 1/1983 |
| DE | 33 28 436 | 4/1984 |
| DE | 34 37 704 | 7/1985 |
| DE | 37 21 751 | 1/1989 |

(List continued on next page.)

OTHER PUBLICATIONS

U.S. patent application Ser. No. 08/838,965, Dultz et al., filed Apr. 23, 1997.

(List continued on next page.)

*Primary Examiner*—James Dudek
*Assistant Examiner*—Mike Qi
(74) *Attorney, Agent, or Firm*—Kenyon & Kenyon

(57) ABSTRACT

A device for the local attenuation of the light intensity in the field of vision of a light-sensitive monitoring and/or recording device (CCD) is described, which is suitable in particular as a glare protection device for video cameras in videophones or correspondingly equipped PCs. The device includes a first objective (L1) and a high resolution ferroelectric liquid crystal modulator (PC, LC) arranged between two polarizers (P1, P2), the liquid crystal modulator having a photo-conductive layer (PC) and a downstream liquid crystal film (LC) made up of helical smectic liquid crystals which is in contact with this layer. The photo-conductive layer (PC) is essentially arranged in the image plane of the first objective (L1), the image plane being imaged onto the monitoring and/or recording device by a second objective (L2). As this occurs, bright light sources or backgrounds are locally suppressed without resulting in a glare or bloom of the image. As an alternative, if the intermediate imaging is omitted, the monitoring and/or recording device (CCD) may be arranged in the image plane of the first objective (L1), the second objective (L2) being eliminated. In this connection, the liquid crystal modulator (PC, LC) is arranged at close proximity to the monitoring and/or recording device (CCD) so that bright interference light sources are not only displayed as darkened but also blurred.

2 Claims, 3 Drawing Sheets

FOREIGN PATENT DOCUMENTS

| | | |
|---|---|---|
| DE | 689 03 393 | 3/1993 |
| DE | 43 05 807 | 10/1994 |
| DE | 196 23 835 | 1/1998 |
| EP | 0 630 627 | 12/1994 |
| EP | 0 678 288 | 10/1995 |
| EP | 0 547 599 | 11/1999 |
| FR | 2 611 389 | 9/1988 |
| FR | 2 626 385 | 7/1989 |
| FR | 2 655 163 | 5/1991 |
| FR | 2 661 755 | 11/1991 |
| JP | 6-19106 | 1/1994 |
| JP | 7-146939 | * 6/1995 |

OTHER PUBLICATIONS

Tomilin, M. et al., "Safety Goggles With Local–Space Modulation," *Mol. Cryst. Liq. Cryst.*, 1992, vol. 222, pp. 119–124.

Beresnev, L. et al., "Deformed helix ferroelectriic liquid crysta display: a new electrooptic mode in ferroelectric chiral smectic C liquid crystals," *Liquid Crystals*, 1989, vol. 5, No. 4, pp. 1171–1177.

Beresnev, L. et al., "X–Ray And Optical Investigations Of The Dislocation Domain In Ferroelectric Liquid Crystals," pp. 1–13, Figs. 1–14.

Patent Abstracts of Japan 6–148598 (A), P–1791, Aug. 24, 1994, vol. 18, No. 454.

Patent Abstracts of Japan 4–141626 (A), P–1413, Sep. 3, 1992, vol. 16, No. 418.

Patent Abstracts of Japan 1–302226 (A), P–1010, Feb. 21, 1990, vol. 14, No. 94.

Patent Abstracts of Japan 60–230121 (A), P–446, Apr. 15, 1986, vol. 10, No. 97.

Patent Abstracts of Japan 60–254120 (A), P–456, May 16, 1986, vol. 10, No. 132.

Osamu et al., Patent Abstracts of Japan 07306421, Nov. 21, 1995.

Die Technik im Leben von heute, 3, Auflage, Mannheim, Meyers Lexikonverlag, 1986, Seiten, pp. 98–101, (Including English translation).

* cited by examiner

DEVICE FOR THE LOCAL ATTENUATION OF THE LIGHT INTENSITY IN THE FIELD OF VISION OF A LIGHT-SENSITIVE MONITORING DEVICE

FIELD OF THE INVENTION

The present invention relates to a device for the local attenuation of the light intensity in the field of vision of a light-sensitive monitoring and/or recording device, for use, for example, as a glare protection device for video cameras in videophones or correspondingly equipped PCs.

RELATED TECHNOLOGY

The enormous progress of modern telecommunications technology will soon make interactive audiovisual communications between two and more persons via videophone or PC a part of our everyday life. In addition to a speaker and a microphone, the terminal devices used for this purpose also include a video camera for recording the persons communicating with each other as well as a screen for displaying them. They are generally located in homes or offices that are used for diverse purposes and have variable lighting which changes over time.

In this connection, the video cameras used are aimed simultaneously at the person telephoning as well as his/her background with possibly extremely variable lighting, which may possibly include even very bright light sources such as the sun or a halogen lamp. Of course, they are controlled in this manner so that the image of the person telephoning is optimally recorded and transmitted to the screen of the other party to the conversation. The dynamic range of the video camera is, however, not great enough to image the bright backgrounds or light sources with optically sharp definition. This results in bloom, which diminishes the quality of the image of the person telephoning.

An automatic reduction of sensitivity, for example, proves to be inadequate for solving this problem, since the image of the person telephoning then becomes excessively dark. For that reason, special non-linear electro-optical components have been used recently, which are locally transparent with weak to average lighting and are locally opaque with strong or very strong lighting so that bright light sources are more strongly attenuated than dark ones. Consequently, local light sources in an image are blended out without darkening the rest of the image.

These components are optically addressable spatial light modulators based on liquid crystals as described, for example, by M. G. Tomilin, A. P. Onokkow and B. Y. Polushkin in Mol. Cryst. Lq. Crys., 222, 119 (1992) on the basis of safety glasses. In this connection, the twist effect in nematic liquid crystals is utilized as the medium acting on the light. However, the principal disadvantage in using nematic liquid crystals is the relatively slow switching time, which is in the range of approximately $10^{-2}$ sec. This leads to blurring or smudging of the suppressed image during the image movement of bright objects in the light modulators used or to the glare of the eye or of a video camera used.

German Patent Application No. 196 16 323.4 and related U.S. patent application Ser. No. 08/838,965 by L. Beresnev et al. describe a high resolution ferroelectric liquid crystal modulator having a substantially higher operating frequency of $10^2$–$10^3$ Hz, the modulator being based on helical smectic liquid crystals in contact with an upstream semi-transparent photo-conductive layer rather than nematic ones (see FIG. 1 of the present application and the associated part of the description). The photo-conductive layer is arranged in the image plane of an imaging objective so that the images of the objects located in the field of vision of the objective are converted into voltage patterns which are transmitted to the liquid crystals and correspondingly reorient them. The liquid crystal modulator arranged between two polarizers thus becomes locally transparent for low light intensities and locally darkened for high light intensities so that bright light sources or backgrounds are locally suppressed without the occurrence of glare or bloom of the image.

The practical application of this liquid crystal modulator is described in the exemplary embodiments only on the basis of glasses in which the images arising on the photo-conductive layer in the most uncomplicated case are first imaged by a lens in such a way that they can be observed by the eye via an additional lens acting as a magnifying lens, the lens being selected and arranged in such a way that a virtual enlarged erect image of the second intermediate imaging comes into being. The described liquid crystal modulator can be made optically inoperative if, in certain states of the applied voltage cycles, it does not have the desired glare-reducing properties.

SUMMARY OF THE INVENTION

An object of the present invention is to produce an improved device based on such a ferroelectric liquid crystal modulator for the local attenuation of the light intensity in the field of vision of a light-sensitive monitoring and/or recording device, the device being suitable in particular as a glare protection device for video cameras in videophones or correspondingly equipped PCs.

The present invention provides for the intermediate imaging of the objects located in the field of vision which arises in a device for the local attenuation of the light intensity in the field of vision of a light-sensitive monitoring and/or recording device (CCD) comprising a first objective (L1) made up of one or several lenses and a high resolution ferroelectric liquid crystal modulator (PC, LC) arranged between two polarizers (P1, P2), the liquid crystal modulator including a photo-conductive layer (PC) and a downstream liquid crystal cell (LC) having helical smectic liquid crystals which is in contact with this layer and is arranged in such a way that the photo-conductive layer (PC) is located in the image plane of the first objective.

The present invention is characterized in that the intermediate imaging is imaged directly onto the monitoring and/or recording device from the photo-conductive layer of the liquid crystal modulator by a second objective made up of one or several lenses so that the second intermediate imaging additionally required in the related art is eliminated, which results in a more compact, lighter and more cost-effective glare protection device.

A second possible solution is to omit the intermediate imaging and to image the objects located in the field of vision directly onto the light-sensitive monitoring and/or recording device by an objective made up of one or several lenses, the monitoring and/or recording device accordingly being essentially arranged in the image plane of the objective. The high resolution ferroelectric liquid crystal modulator is in this case arranged in close proximity in front of the monitoring and/or recording device in the beam path of the objective, the liquid crystal modulator being located in turn between two polarizers. An optical fiber plate may be arranged between the high resolution liquid crystal modulator and the monitoring and/or recording device for improved image transmission. The present invention thus also provides a device for the local attenuation of the light intensity in the field of vision of a light-sensitive monitoring and/or recording device (CCD) comprising an objective (L1) made up of one or several lenses and a high resolution ferroelectric liquid crystal modulator (PC, LC) arranged between two polarizers (P1, P2) in the beam path of the objective, the liquid crystal modulator including a photo-conductive layer (PC) and a downstream liquid crystal cell (LC) having helical smectic liquid crystals which is in contact with this layer, characterized in that the monitoring and/or recording device (CCD) with an upstream liquid crystal modulator (PC, LC) is arranged in the image plane of the objective (L1).

In this type of glare protection device, the objects are naturally imaged somewhat indistinctly on the photo-conductive layer of the liquid crystal modulator so that bright interference light sources are advantageously shown not only darkened but also blurred. In addition, omitting the intermediate imaging also makes it possible to substantially reduce the overall length and weight, since the second objective is eliminated without being replaced. Since this objective is customarily of high quality and expense, this embodiment of the present invention is also connected with considerable cost savings.

Since the light incident on the photo-conductive layer of the liquid crystal modulator is partially absorbed, both embodiments preferably include a color filter via which the light's spectral components are changed in such a way that the light-sensitive monitoring and/or recording device, which is preferably a CCD camera, delivers an image of the person telephoning or of another object located in the field of vision having color fidelity. The color filter preferably located between the first objective and the photo-conductive layer thus acts as a color correction filter for the components of the camera and for the color distortion caused by the color temperature of the light sources and must be tuned accordingly.

In color cameras, a mosaic color filter is preferably arranged directly in front of the light-sensitive monitoring and/or recording device.

In addition, the described devices preferably include an optical shutter or compensator to interrupt the beam path if the liquid crystal modulator does not have the desired glare-reducing properties in order to prevent possible damage to the light-sensitive monitoring and/or recording device as a result of excessively high light intensities. In this connection, the optical shutter may be designed as a fast ferroelectric liquid crystal switch as described, for example, in the above-mentioned German Patent Application 196 16 323.4 by Beresnev et al. However, it may also be designed as a different electro-optical or electromechanical shutter or switch such as are known to experts in this field. For example, an electro-optical shutter designed as a switchable retardation plate is arranged between two polarizers in order to obtain an extinguishing of light. According to the present invention, the shutter can be arranged both between the front objective and the liquid crystal modulator and between the liquid crystal modulator and the light-sensitive monitoring and/or recording device.

BRIEF DESCRIPTION OF THE DRAWINGS

Additional features and advantages of the present invention are derived not only from the associated claims—per se and/or in combination—but rather also from the following extensive description of special exemplary embodiments in connection with the associated drawings in which similar components are also identified identically:

DETAILED DESCRIPTION

Figure 1:
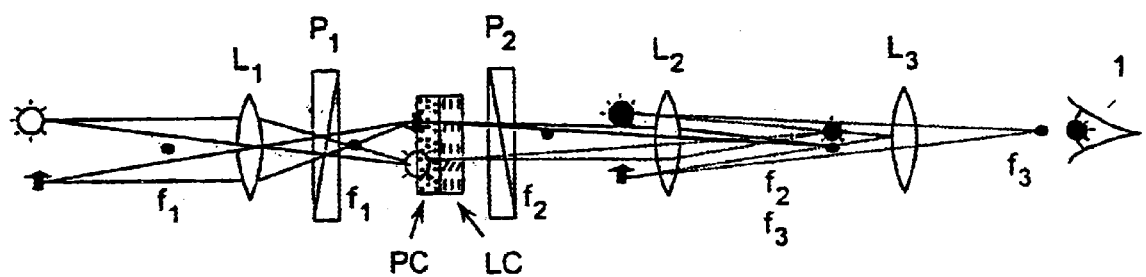
FIG. 1 shows a glare protection device according to the known methods designed as a pair of glasses for the local attenuation of high light intensities.

FIG. 1 is a schematic representation of a pair of glasses according to related methods for the local attenuation of high light intensities via a high resolution ferroelectric liquid crystal modulator (PC, LC) which includes a semitransparent photo-conductive layer (PC) and a downstream liquid crystal film (LC) having helical smectic liquid crystals, the liquid crystal film being in contact with this photo-conductive layer and which is arranged between two polarizers (P1, P2). It may be assumed that a very bright object, such as the sun, and a relatively weakly illuminated object, such as a house or a person, which are observed through the glasses, are located in the field of vision of the glasses. The two objects are imaged adjacent to each other onto the photo-conductive layer (PC) by a first objective (L1) made up of one or several lenses. The photo-conductive layer (PC) converts this image into a voltage pattern which is transferred to the liquid crystal film or the liquid crystal cell and reorients it in such a way that in connection with polarizers P1 and P2, it becomes locally transparent for low light intensities and locally darkened for high light intensities.

This effect is based on the fact that the light from weakly illuminated objects such as the house or the person can pass through crossed polarizers P1 and P2 essentially unhindered with a twisted nematic liquid crystal layer. The light focusing on layer PC from strongly illuminated objects such as the sun on the other hand induces in the layer a local transition from the twisted state to the homeotropic state due to a voltage applied externally to the liquid crystal modulator. In this connection, the transition from twisted to homeotropic is only completed at the point of the liquid crystal modulator at which the conductivity of photo-conductor PC increases due to the strong illumination by the sun so that the light at this point does not pass through polarizer P2 and the brightness of the strongly illuminated object, i.e., the sun is strongly attenuated in the resulting image without the image itself being darkened. This effect is similar to solarization in photography in which, for example, the sun is depicted darkly in the image of a winter landscape. Both cases are non-linear optical processes, one of which takes place in ferroelectric liquid crystals while the other takes place in silver halides.

In the most uncomplicated case, the imaging of the object field on the photo-conductive layer is now imaged once more via a downstream lens. This second intermediate imaging can then be observed with the eye via a second downstream lens which is selected and arranged in such a way that an observable, virtual, enlarged, erect image of the object field is produced.

Figure 2:
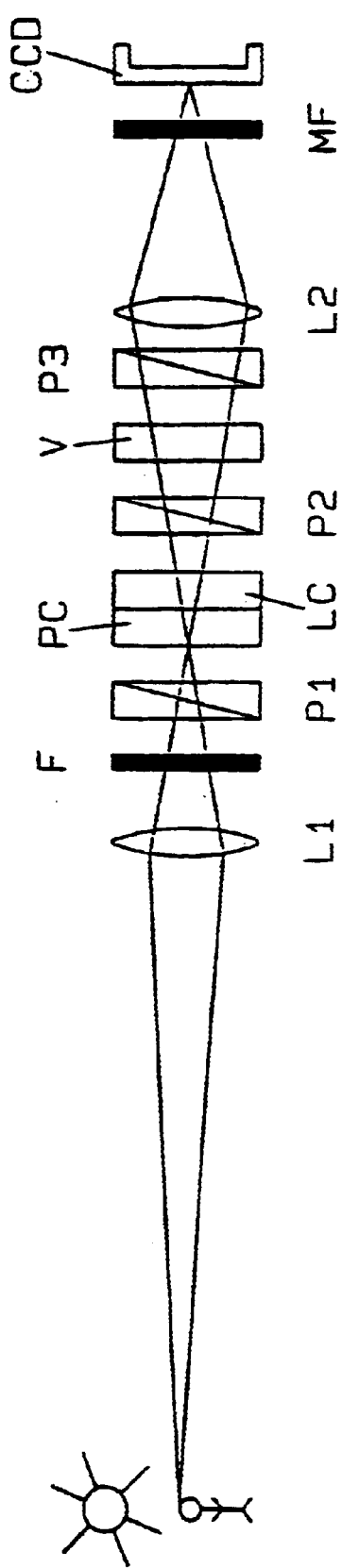
FIG. 2 shows a glare protection device according to the present invention with intermediate imaging onto the photo-conductive layer of a high resolution ferroelectric liquid crystal modulator.

In the glare protection device according to the present invention shown in FIG. 2, the objects located in the field of vision, such as the sun and a person or a house are, as in the related device just described, also imaged initially via a first objective L1 made up of one or several lenses onto photo-conductive layer PC of a liquid crystal modulator essentially located in the image plane of objective L1, the liquid crystal modulator being of the type of the methods described above and being arranged in turn between two polarizers P1 and P2. By omitting the second intermediate imaging required in the above methods, this intermediate imaging of the object field is now imaged, according to the present invention, onto a monitoring and/or recording CCD device directly via a downstream second objective L2 or through an optical fiber plate (light conducting plate), the device being a CCD color video camera in this case.

As already described above, the images of the person and the sun formed on photo-conducting layer PC of liquid crystal modulator PC, LC are converted into voltage patterns which are transmitted to the downstream liquid crystal cell and which reorient the liquid crystal film in such a way that, in connection with polarizers P1 and P2, it becomes locally transparent for low light intensities while it is locally darkened for high light intensities.

Since the light impacting the photo-conductive layer is partially absorbed, its spectral components are changed by an upstream color filter F in such a way that the CCD camera delivers an image of the person having color fidelity. Color correction filter F thus corrects the color distortion caused by the color temperature of the light sources in the object field and by the color absorption of the liquid crystal modulator, polarizers P1 and P2 and the other optical components. It must therefore be tuned to the components of the camera.

A mosaic color filter MF is arranged directly in front of the video camera.

A fast ferroelectric liquid crystal switch V arranged between polarizer P2 and an additional polarizer P3, which interrupts the beam path at the moment in which liquid crystal modulator PC, LC does not possess the desired glare-reducing properties, is located between liquid crystal modulator PC, LC and the second objective L2. A switch or a shutter V of the type named is disclosed, for example in the German Patent Application No. 196 16 323.4 and U.S. patent application Ser. No. 08/838,965 by L. Beresnev et al, both of which are incorporated by reference herein. Shutter V can also be designed as a different electro-optical or electromechanical shutter or switch as in the known related art. Shutter V may also be arranged at a different point in the optical system such as between first objective L1 and liquid crystal modulator PC, LC as is the case in the embodiment of the present invention shown in FIG. 3.

The intermediate imaging projected onto photo-conductive layer PC of liquid crystal modulator PC, LC shown in FIG. 1 and FIG. 2 is not absolutely necessary for video cameras, since, in contrast to the eye, in their case it is possible to approach the light-sensitive plane of the video camera, i.e., the CCD camera chip, up to a few micrometers, although this intermediate imaging may also be of advantage in video cameras for purposes of enlargement.

Figure 3:
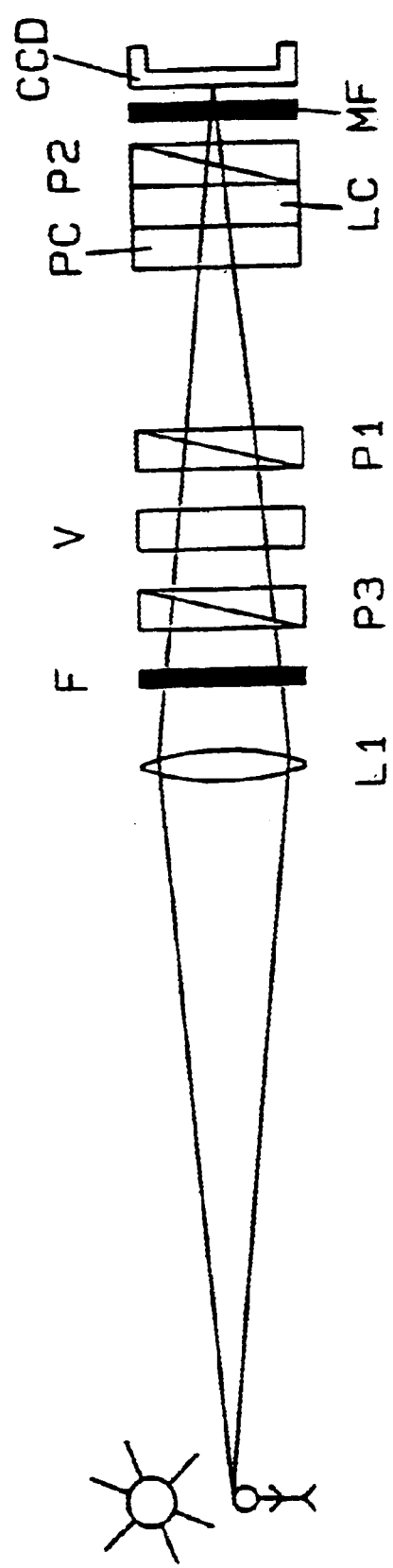
FIG. 3 shows a glare protection device according to the present invention with direct imaging onto the CCD device of a video camera.

A corresponding design variant according to the present invention without intermediate imaging is shown in FIG. 3 in which the complete package made up of liquid crystal modulator PC, LC, downstream polarizer P2 and mosaic filter MF is arranged in close proximity in front of light-sensitive layer CCD, while shutter V, which in turn is arranged between two polarizers P3 and P2, is located between imaging objective L1 and photo-conductive layer PC of liquid crystal modulator PC, LC.

In this case, the images of the objects located in the field of vision are projected directly onto the CCD layer which is essentially arranged in the image plane of objective L1 without the necessity of intermediate imaging onto photo-conductive layer PC of liquid crystal modulator PC, LC as in the embodiment of the present invention shown in FIG. 2 or even a second intermediate imaging as in the known methods. The image of the sun on photo-conductive layer PC is then not entirely well-defined; however, this is immaterial, since it is suppressed in any case. This arrangement according to the present invention even has the advantage that bright interference light sources and backgrounds are depicted as not only darkened but also blurred.

As already mentioned, this considerably reduces the overall length in contrast to a glare protection device with intermediate imaging, since objective 12 is eliminated without being replaced. Since this is customarily a high quality and expensive objective, the optical system of the present invention according to FIG. 3 not only has an additional noticeable weight advantage but rather a significant additional price advantage in relation to the design variant of the invention according to FIG. 2, which is itself more compact, more cost-effective and lighter than the glare protection device of the related methods according to FIG. 1.

What is claimed is:

1. A device for local attenuation of light intensity in a field of vision of at least one of a light-sensitive monitoring and/or recording device, the device comprising:

a first objective having an image field and including at least one lens;

a high resolution ferroelectric liquid crystal modulator arranged between two polarizers, the liquid crystal modulator including a photo-conductive layer and a downstream liquid crystal cell having helical smectic liquid crystals in contact with the photo-conductive layer, the liquid crystal modulator being arranged so that the photo-conductive layer is located in an image plane of the first objective;

a second objective including at least one other lens, the image field of the first objective being imaged onto the monitoring and/or recording device by the second objective; and a mosaic color filter located upstream of the light-sensitive monitoring and/or recording device.

2. A device for local attenuation of light intensity in a field of vision of at least one of a light-sensitive monitoring and/or recording device comprising:

an objective having a beam path and an image plane, the objective including at least one lens;

a high resolution ferroelectric liquid crystal modulator arranged between two polarizers in the beam path, the liquid crystal modulator including a photo-conductive layer and a downstream liquid crystal cell having helical smectic liquid crystals, the liquid crystal cell being in contact with the photo-conductive layer; and a mosaic color filter located upstream of the light-sensitive monitoring and/or recording device;

the monitoring and/or recording device being downstream of the liquid crystal modulator and being arranged in the image plane of the objective.

* * * * *